(12) United States Patent
Hayashi et al.

(10) Patent No.: US 7,782,518 B2
(45) Date of Patent: Aug. 24, 2010

(54) ELECTRODEPOSITION METHOD LIGHT MODULATING DEVICE, ELECTRODEPOSITION METHOD REFLECTIVE DISPLAY DEVICE, AND METHOD OF MANUFACTURING TRANSPARENT ELECTRODE FOR AN ELECTRODEPOSITION METHOD

(75) Inventors: Naoyuki Hayashi, Kanagawa (JP); Koichi Kawamura, Kanagawa (JP); Takashi Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/318,069

(22) Filed: Dec. 22, 2008

(65) Prior Publication Data

US 2009/0168139 A1 Jul. 2, 2009

(30) Foreign Application Priority Data

Dec. 28, 2007 (JP) ............................. 2007-340291

(51) Int. Cl.
*G02F 1/15* (2006.01)
*G02F 1/153* (2006.01)
*G02F 1/00* (2006.01)

(52) U.S. Cl. .................... 359/265; 359/269; 252/583

(58) Field of Classification Search ......... 359/265–275; 252/583

See application file for complete search history.

(56) References Cited

U.S. PATENT DOCUMENTS

| 4,240,716 A | 12/1980 | Camlibel et al. |
| 4,240,717 A | 12/1980 | Camlibel et al. |
| 2009/0078917 A1* | 3/2009 | Percec et al. ............... 252/583 |

FOREIGN PATENT DOCUMENTS

| JP | A 63-24225 | 2/1988 |
| JP | A 10-206907 | 8/1998 |
| JP | A 2000-235198 | 8/2000 |
| JP | A 2006-235484 | 9/2006 |

* cited by examiner

*Primary Examiner*—William C Choi
(74) *Attorney, Agent, or Firm*—Solaris Intellectual Property Group, PLLC (57) ABSTRACT

There is provided an electrodeposition method light modulating device including: (1) a transparent electrode, to which a polymer having a metallocene at a side chain thereof is fixed by a chemical bond; (2) a transparent electrode that is disposed to face the transparent electrode (1), and forms metal through a reducing reaction of metal ions thereon; and (3) an electrolytic solution containing the metal ions, which can be reduced by applying current thereto, and disposed between the transparent electrode (1) and the transparent electrode (2). In an electrodeposition method reflective display device, the electrolytic solution is held by a gelatinous polymer, and the white pigment is dispersed in the gelatinous polymer.

18 Claims, 1 Drawing Sheet

FIG. 1

ELECTRODEPOSITION METHOD LIGHT MODULATING DEVICE, ELECTRODEPOSITION METHOD REFLECTIVE DISPLAY DEVICE, AND METHOD OF MANUFACTURING TRANSPARENT ELECTRODE FOR AN ELECTRODEPOSITION METHOD

CROSS-REFERENCE TO RELATED APPLICATION

This application claims priority under 35USC 119 from Japanese Patent Application No. 2007-340291, the disclosure of which is incorporated herein by reference.

BACKGROUND OF THE INVENTION

1. Field of the Invention

The present invention relates to an electrodeposition method light modulating device, an electrodeposition method reflective display device, and a method of manufacturing a transparent electrode for an electrodeposition method.

2. Description of the Related Art

An electrodeposition system, which is a kind of electrochromic system, is a system, in which metal is deposited on a transparent electrode, or metal on a transparent electrode is dissolved, by applying current to an electrolytic solution containing metal ions. In a state in which metal is deposited on the transparent electrode, a high light-shielding performance attributable to reflection from a mirror surface of the metal or absorption by fine particles of the metal is achieved. In contrast, in the metal ion state, a high transparency attributable to a clear and colorless electrolytic solution containing metal ions is exhibited (see U.S. Pat. Nos. 4,240,716 and 4,240,717).

In the electrodeposition method, silver, lead, bismuth, copper or the like as the metal is reversibly electroplated. In particular, when silver is used, the silver can be stably electrodeposited repeatedly, and a high light-shielding performance can be attained.

In the electrodeposition method using silver, an electrolytic solution, in which a supporting electrolyte containing a halogen and a silver halide are dissolved in an aprotic polar solvent such as N,N-dimethyl formamide (DMF) or N,N-dimethyl acetamide (DMAc), is introduced between opposing transparent electrodes. Alternatively, a polymer solid electrolyte formed by mixing the electrolytic solution with a polymer is introduced between opposing transparent electrodes.

When current is applied to the transparent electrodes, and the potential exceeds a certain potential (deposition overpotential), silver is deposited on the transparent electrode to develop color. Further, the current application is interrupted or a reverse potential is applied to the electrode, so that the silver on the transparent electrode is re-dissolved and the electrolytic solution can become transparent again.

However, in an electrochromic type light modulation system, there is a problem such that a voltage drop attributable to a high surface resistance ($10\Omega/\square$ or more) of the transparent electrode (ITO, IZO, ZnO or the like) is caused. In particular, an effective voltage is reduced in a central portion of a large-sized substrate so that metal is not deposited and an unevenness in density may arise at the time of light-shielding.

In order to cope with the problem, it has been proposed that a material for promoting a reduction reaction of metal ions is added to an electrolytic solution. For example, in Japanese Patent Application Laid-Open (JP-A) No. 2006-235484, as reduction promoting materials, hydroquinone, catechol, or the derivatives thereof, 1,4-naththalene diol, 1,5-naphthalene diol or the derivatives thereof, ferrocene, potassium ferrocyanide, or the like is proposed.

In particular, a ferrocene is stable in an electrochemical reaction, and promotes stably a reduction reaction, so that silver can be deposited even in a central portion of a large-sized substrate.

As a technique in which a ferrocene is used, for example, in JP-A No. 63-24225, a method, in which a ferrocene polymer and electroconductive fine particles are mixed with a binder, and the mixture is coated on a electrode, is proposed. In JP-A No. 10-206907, a method, in which a ferrocene carboxylic acid is amide-bonded to electroconductive particles modified with a silane having an amino group at the terminal end thereof, and the thus obtained electroconductive particles are coated on an electrode and burned, is proposed. In JP-A No. 2000-235198, a method for copolymerizing a ferrocene polymer with a polymer solid electrolyte is proposed.

SUMMARY OF THE INVENTION

A first aspect of the present invention is to provide an electrodeposition method light modulating device comprising:

(1) a transparent electrode, to which a polymer having a metallocene at a side chain thereof is fixed by a chemical bond;

(2) a transparent electrode that is disposed to face the transparent electrode (1), and forms metal through a reducing reaction of metal ions thereon; and (3) an electrolytic solution containing the metal ions, which can be reduced by applying current thereto, and disposed between the transparent electrode (1) and the transparent electrode (2).

A second aspect of the present invention is to provide an electrodeposition method reflective display device comprising:

(1) a transparent electrode, to which a polymer having a metallocene at a side chain thereof is fixed by a chemical bond;

(2) a transparent electrode that is disposed to face the transparent electrode (1), and forms metal through a reducing reaction of metal ions thereon; and (3) an electrolytic solution that is held by a gelatinous polymer and contains a white pigment and the metal ions, which can be reduced by applying current thereto, and disposed between the transparent electrode (1) and the transparent electrode (2).

A third aspect of the present invention is to provide a method of manufacturing a transparent electrode for an electrodeposition method comprising:

applying a coupling agent having a bond that generates a radical through cleavage upon being irradiated with an ultraviolet ray to a transparent electrode;

further applying a metallocene monomer thereto; and irradiating an ultraviolet ray thereto, so that a polymer having the metallocene at a side chain of the polymer is fixed to the transparent electrode by a chemical bond.

DETAILED DESCRIPTION OF THE INVENTION

The conventional method using a ferrocene in the above originally aims at promoting coloration of electrochromic material, and it is not necessary to deposit metal in the conventional method to the extent of exhibiting a light-shielding ability as in the electrodeposition method. Accordingly, in the conventional techniques, application for the electrodeposition method is not presumed, and the conventional electrochromic method as such cannot be applied to the electrodeposition method.

More specifically, in the above conventional techniques, it has been found that since an oxidized ferrocene (ferrocenium ion) exists apart from the surface of an electrode, problems occur such that (1) the reducing reaction does not proceed due to the diffusion limitation of the ferrocenium ion, whereby the oxidation reaction of silver, i.e. rate of dissolution of silver is slow, and (2) deposited ferrocenium ions float, whereby the transmittance is lowered at the time of being transparent.

Further, when a polymer having a ferrocene at a side chain thereof is mixed with a binder or copolymerized with a solid electrolyte, it has been found that problems arise such that, since only a small amount of the ferrocene existing in the vicinity of an electrode is associated with the oxidation reaction, the effect of promoting the reducing reaction is small with respect to an increase in addition amount of the ferrocene, and light absorption due to the ferrocene occurs, resulting in a decrease in transmittance at the time of being transparent.

Furthermore, when a ferrocene carboxylic acid is subjected to amide bonding, it has been found that a problem such that the amount of the ferrocene to be oxidized is small arises.

Furthermore, in the electrodeposition method, a large amount of metal is deposited so that a large amount of charge is required as compared with the electrochromic system, and a metal layer formed by the deposition has a high electroconductivity. As a result, in the electrodeposition method, it has been found that a large current is generated and the voltage drop becomes large as compared with the electrochromic system, so that light modulation becomes difficult in the central portion of the substrate.

In order to exhibit high coloration density, it is necessary to increase the amount of a metal to deposit, and therefore, it is necessary to increase the amount of a charge that contributes to the reduction reaction. In order to increase the amount of the charge, the additive amount of metallocene may be increased. However, it has become clear that there is a problem such that, when the amount of metallocene is increased, transmittance is lowered at the time of being transparent.

As a result of further extensive and intensive investigations, the present inventors have found that instead of using metallocene as a monomer, when a polymer having a metallocene at a side chain thereof is used, with the metallocene fixed within the polymer as a portion thereof, and the polymer is further fixed to the transparent electrode by a chemical bond, transfer of a charge becomes smooth between the metallocene and the transparent electrode.

That is, a polymer having plural metallocenes is formed so as to increase the number of metallocenes, and the polymer is fixed to the transparent electrode by a chemical bond so as to deposit a lot of metallocenes only in the vicinity of the electrode. As a result, the amount of the charge transfer increases due to use of the polymer of metallocene, a distance between the metallocene and the electrode is shortened by fixing the polymer to the electrode by a chemical bond, and transfer of the charge is effectively carried out through a polymer chain.

Accordingly, when a polymer having a metallocene at a side chain thereof is fixed to the transparent electrode by a chemical bond, the charge transfer rate and the amount of the charge are enhanced without increasing the total amount of metallocene in the electrolytic solution very much.

This reduces the voltage drop in addition to the exhibition of a high coloration density, whereby a coloration density in the surface of a substrate becomes uniform. Furthermore, the charge is effectively transferred, whereby a decoloration speed becomes faster. Also, the number of floating metallocenes which do not contribute to the reduction reaction decreases in the electrolytic solution, whereby a transmittance at the time of being transparent becomes high.

The present invention has solved the above problems, and provides an electrodeposition method light modulating device having a high coloration density, a uniform coloration density in the surface of a substrate, and a high decoloration speed, and a high transmittance at the time of being transparent.

Furthermore, the present invention provides an electrodeposition method reflective display device having a high coloration density, a uniform coloration density in the surface of a substrate, and a high decoloration speed, and a high whiteness at the time of being white.

Hereinafter, exemplary embodiments of the present invention will be explained with reference to the drawing and examples.

Here, the drawing and examples are provided for the purpose of illustration and description, and do not restrict the present invention. Obviously, any modifications and variations will be within the scope of the present invention as far as they meet the spirit of the present invention. Further, the same denotations are given to the same elements in the drawing. In the specification, "-" between numerals represents the numerals of the both sides of "-" are inclusive as the minimum value and the maximum value, respectively.

1. An Electrodeposition Method Light Modulating Device

Figure 1:
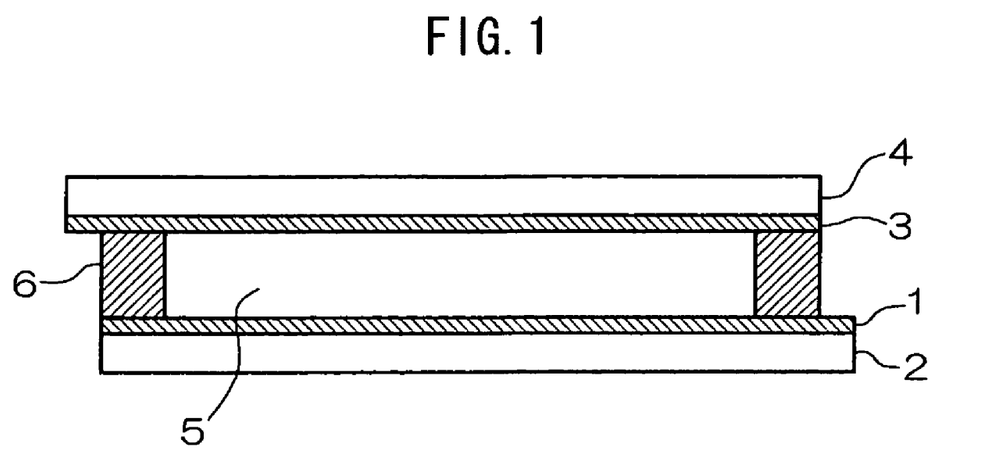
FIG. 1 is a schematic cross-sectional drawing of an electrodeposition method light modulating device of the present invention.

FIG. 1 is a schematic cross-sectional view of an electrodeposition method light modulating device.

The electrodeposition method light modulating device in FIG. 1 includes a transparent electrode 1 on a transparent electrode substrate 2, and a opposing transparent electrode 3 on a counter electrode side substrate 4. An electrolytic solution 5 is provided between the transparent electrode 1 and the opposing transparent electrode 3. The electrolytic solution 5 contains metal ions that can undergo coloration and decoloration repeatedly by reduction and oxidization, respectively. A seal wall 6 for surrounding and sealing the electrolytic solution 5 is provided between the transparent electrode substrate 2 and the counter electrode side substrate 4.

The polymer having a metallocene at a side chain thereof (hereinafter, may be referred to as a "metallocene polymer" in this specification) is fixed to the surface of either one of the transparent electrode 1 or the opposing transparent electrode 3 by a chemical bond. On the other transparent electrode, to which the metallocene is not fixed, metal ions in the electrolytic solution 5 are reduced by applying voltage to form metal.

Hereinafter, explanations will be given based on the descriptions that the electrode, to which the metallocene polymer is fixed, is called a "first electrode", and the other electrode is called a "second electrode".

Furthermore, the first electrode (polymer having a metallocene at a side chain thereof, a method of fixing the polymer to the electrode, and the like), the second electrode, the electrolytic solution, and the other structural components of the light modulating device of the present invention will be described hereinafter, in detail.

<First Electrode>
(Transparent Electrode)

The first electrode, to which a metallocene polymer is fixed, is a transparent electrode. Materials for the transparent electrode are not specifically restricted as long as the materials are electroconductive. For example, known materials such as highly conductive metals such as silver, gold, platinum, aluminum or copper, and metal oxides such as ITO, FTO, $SnO_2$, IZO, ZnO or AZO, can be used. From the viewpoint of durability in a redox reaction, FTO and AZO are preferable, and from the viewpoint of a transparent electrode with a high transmittance and a low resistivity, ITO, FTO or AZO are preferable, ITO is more preferable. In addition, these metals and metal oxides may have a lamination structure, as occasion demands.

(Substrate)

A transparent electrode as the first electrode is provided on a substrate. As long as the substrate can provide with a transparent electrode thereon, and can seal an electrolytic solution without being dissolved and being deformed with the electrolytic solution, any kind of substrates may be used. The material include glasses such as quartz glass, soda glass or borosilicate glass; metals; ceramics; thermoplastic polyester resins such as polyethylene naphthalate (PEN) or polyethylene terephthalate (PET); polyamides; polycarbonates, cellulose ester resins such as cellulose acetate; fluorine-containing resins such as polyvinylidene fluoride and tetrafluoroethylene-hexafluoropropylene copolymer; polyethers such as polyoxymethylene; polyacetals; polystyrene; polyolefins such as polyethylene, polypropylene or methylpentene polymer; cycloolefin-based resins represented by the trade names such as ZEONOR or ZEONEX (manufactured by Zeon Corporation), or ARTON (trade name; manufactured by JSR Corporation); or polyimide-based resins such as polyimide-amide, or polyether-imide.

In particular, for the purpose of controlling outside light, glasses such as quartz glass, soda glass or borosilicate glass is preferably used for the substrate, and for the use of portable small devices such as a mobile phone or a digital camera, polyethylene naphthalate (PEN), ZEONOR or ZEONEX (trade names; manufactured by Zeon Corporation) is suitably used.

(Polymer with Metallocene at a Side Chain Thereof)

The metallocene is an organic metal compound in which two cyclopentadienyl anions are coordinated on the both sides of a central metal (Fe, Ti, Zr, Ni and the like). The central metal in the metallocene is electrochemically redox-reacted to increase or decrease the valence thereof reversibly.

In particular, a ferrocene having Fe as a central metal is a compound with an excellent reiterative stability in the electrochemical reaction, and is suitable for the present invention. Here, the valence of the ferrocene changes from $Fe^{2+}$ to $Fe^{3+}$ by being oxidized, and the generated electron is used for the reduction of the metal ions in an electrolytic solution to deposit metal.

The "polymer having a metallocene at a side chain thereof" in the present invention refers to a compound in which a metallocene is bonded to a side chain with respect to the main chain of a polymer. For example, a metallocene polymer can be obtained by introducing a vinyl group, an acryloyl group, a methacryloyl group, an allyl group, or the like into a metallocene (for example, ferrocene), and polymerizing these groups by a method generally used. Further, an optional functional group such as a carboxyl group, a benzoyl group, an alkyl group, or an amino group may be introduced into a metallocene polymer, unless the electrochemical reaction is influenced.

The metallocene polymer is preferably a polymer represented by the following Formula (I);

Formula (I)

In the Formula (I), R represents a hydrogen atom or a methyl group; Y represents a single bond or a divalent linking group; and M represents Fe, Ti, Zr or Ni.

Y in the Formula (I) represents a single bond or a divalent linking group, and Y is preferably a single bond or the following Structural Formula Y Structural Formula Y

In the Structural Formula Y, $R^2$ represents a hydrogen atom or an alkyl group. The alkyl group represented by $R^2$ is preferably an alkyl group having 1 to 6 carbon atoms, and more preferably an alkyl group having 1 to 3 carbon atoms. In particular, $R^2$ is preferably a hydrogen atom or a methyl group.

M in the Formula (I) is preferably Fe. Namely, the metallocene polymer of the present invention is preferably a polymer having a ferrocene (ferrocene derivative) at a side chain of the polymer (or a polymer of a ferrocene derivative) (hereinafter, may be referred to as a "ferrocene polymer").

Examples of the ferrocene polymer are shown below, but are not limited to these examples.

-continued

Here, in the present invention, the "polymer" expresses a comprehensive concept including an oligomer. Although the molecular weight of the metallocene polymer is not specifically restricted, in consideration of suitable charge transfer degree, charge transfer velocity, coloration density, transparency or the like, "n" in the Formula (I) is preferably from 2 to 100,000, and more preferably from 10 to 1,000.

(Chemical Bond)

Methods of chemically linking the metallocene polymer to the first electrode, include methods for forming an amide bond, an imide bond, a urea bond, an ester bond, a covalent bond or the like between a modified moiety formed by modifying the surface of the first electrode, and the functional group of the metallocene polymer. Known methods may be used for forming the amide bond, the imide bond, the urea bond, the ester bond, the covalent bond or the like.

The methods of modifying the surface of the transparent electrode include a method, in which a coupling agent containing at least one element selected from the group consisting of silicon, titanium, aluminum and zirconium is used. The coupling agent contains a halogen atom such as Cl, an alkoxy groups such as $OCH_3$ or $OC_2H_5$, as a functional group, for reacting the functional group with the surface of the electrode, and, for example, a trichlorosilyl group, a triethoxysilyl group, a trimethoxysilyl group or the like are preferred, When the surface of the first electrode is modified with a coupling agent, the first electrode is preferably subjected to a UV ozonization after the first electrode is washed with an alcohol, pure water or the like.

The methods of treating the first electrode after the UV ozonization with a coupling agent include the following known methods;

(1) after a coupling agent is dissolved in a dehydrated toluene and the first electrode is immersed in this solvent for 1 hour or more, the first electrode is re-washed;

(2) a coupling agent is dissolved in a dehydrated toluene, and the first electrode substrate is coated with the resultant solution, and the substrate is allowed to stand in a furnace heated at 100° C.;

(3) a coupling agent is dissolved in a mixed solution of an alcohol and pure water, and the first electrode substrate is coated with the resultant solution, and dried by heating, and, thereafter, re-washed; and, (4) the first electrode substrate is directly coated with a coupling agent, and dried by heating, and, thereafter, re-washed.

As a method of linking a coupling agent to a metallocene polymer, the following two methods can be exemplified.

As the first method, for example, a coupling agent having an arbitrary functional group such as an amino group, a ureido group, a sulfide group, a mercapto group or a carboxyl group is bonded to a transparent electrode, and this functional group is allowed to react with a functional group of a metallocene polymer to form an amide bond, an imide bond, a urea bond, an ester bond, or the like.

More specifically, in the case of the coupling agent having an amino group, for example, the method of forming an amide bond by combining the metallocene polymer having a carboxylic group with the coupling agent is exemplified.

Specific examples of the metallocene polymer, into which an arbitrary functional group such as a carboxyl group, a benzoyl group, an alkyl group and an amino group is introduced, for the purpose of connecting the coupling agent to the metallocene polymer, include, for example, a metallocene polymer having a carboxyl group, an amino group, an isocyanate group, a glycidyl group, a mercapto group or the like.

As a coupling agent used for linking a metallocene polymer to an electrode by the first method, the coupling agent represented by the following Formula (1) is suitable.

Formula (1)

In the Formula (1), X independently represents a halogen atom or an alkoxy group; $L^1$ represents a single bond or a divalent linking group; and A represents an amino group, a ureido group, a sulfide group, a mercapto group, a glycidyl group or an isocyanate group.

X in the Formula (1) is preferably a chlorine atom, a methoxy group or an ethoxy group, independently.

$L^1$ in the Formula (1) is preferably a single bond, or a divalent linking group such as an alkylene group having 1 to 18 carbon atoms or an amino group.

Further, a second method of linking a metallocene polymer to a coupling agent is a method of performing simultaneously a polymerization reaction of a metallocene monomer, and a chemical bonding of the metallocene polymer with a coupling agent. As such a method, a surface graft method with the use of radical polymerization can be exemplified. In the present invention, the use of the surface graft method is preferable in view of increasing the polymerization degree of the metallocene polymer, and enhancing the adhesiveness of the metallocene polymer with a substrate.

The following methods may be used for the surface graft method:

(1) a monomer solution containing the metallocene having any one of a vinyl group, an acryloyl group, a methacryloyl group or an allyl group is prepared, and (A) a method of coating the above metallocene solution on a first electrode substrate treated with a coupling agent, into which an azo group is introduced, and heating thereof; or (B) a method of coating the above metallocene solution on a first electrode substrate treated with a coupling agent containing an aromatic ketone group, a benzylimide group, a trichloromethyl group, a benzyl chloride group or the like having a bond that undergoes cleavage upon being irradiated with an ultraviolet ray to generate a radical, and irradiating the coated electrode substrate with an ultraviolet ray;

(2) a method in which a first electrode substrate treated with a coupling agent having a vinyl group, an acryloyl group, a methacryloyl group, or an allyl group is coated with solution, in which a metallocene monomer and a radical polymerization initiator are dissolved, and the coated substrate is heated and/or irradiated with an ultraviolet ray.

—Surface Graft Method of the Above 1-A—

As the metallocene monomer containing any of a vinyl group, an acryloyl group, a methacryloyl group or an allyl group, for example, it is preferable to use a vinyl ferrocene, a divinyl ferrocene, an acryloyl ferrocene, a methacryloyl ferrocene, or the like.

As the solvent for the metallocene monomer solution, it is preferable to use known aprotic polar solvents such as N,N-dimethyl formamide, dimethyl sulfoxide, dimethyl acetamide, or N-methylpyrrolidone, in consideration of the subsequent heating process, the solubility of the metallocene monomer, the evaporation of the solvent during the course of polymerization, or the like.

The concentration of the metallocene monomer in the metallocene monomer solution is preferably in the range of from 0.05 mol/L to 2 mol/L from the viewpoint of bringing the metallocene polymer to a higher molecular weight.

With regard to the coupling agent, into which an azo group is introduced, Polymer Commutations Vol. 32, No. 2, pp 50-53, or Macromocules, Vol. 31, No. 3, pp 592-600, or others, can be referred to, and specifically, for example, the coupling agent represented by the following Formula (2) is suitable.

Formula (2)

In the Formula (2), X independently represents a halogen atom or an alkoxy group; $L^2$ and $L^{2'}$ each independently represent a single bond or a divalent linking group; B represents an azo group (—N═N—); and R and R' each independently represent an arbitrary functional group.

X in the Formula (2) is preferably a chlorine atom, a methoxy group and an ethoxy group, independently.

Preferably, $L^2$ and $L^{2'}$ in the Formula (2) each independently represent a single bond or an alkylene group having 1 to 18 carbon atoms; and preferably, R and R' each independently represent an amino group, a carboxyl group, a hydroxyl group, a ureido group or the like. In addition, $L^2$ and $L^{2'}$ may be the same, or may be different from each other; and R and R' may be the same, or may be different from each other.

Further, the heating temperature in the surface graft method of A-1 in the above is preferably from 0° C. to 100° C., and more preferably from 40° C. to 80° C., from the viewpoint of the half-life of the azo group and the reaction time, although the heating temperature varies with the kind of the coupling agent.

—Surface Graft Method of the Above 1-B—

As the metallocene monomer containing any one of a vinyl group, an acryloyl group, a methacryloyl group or an allyl group, metallocene monomers described in the above surface graft method A-1 can be exemplified, and are preferably metallocene monomers having a vinyl group or a methacryloyl group.

As the solvent for the metallocene monomer solution in the surface graft method of the above 1-B, it is preferable to use known aprotic polar solvents such as N,N-dimethyl formamide, dimethyl sulfoxide, dimethyl acetamide, or N-methylpyrrolidone, in consideration of the solubility of metallocene monomer, the evaporation of the solvent during the course of polymerization, or the like.

The concentration of the metallocene monomer in the metallocene monomer solution is preferably in the range of from 0.05 mol/L to 2.0 mol/L from the viewpoint of bringing the metallocene polymer to a higher molecular weight.

As the coupling agent containing an aromatic ketone group, a benzyl imide group, a trichloromethyl group, a benzyl chloride group or the like having a bond that undergoes cleavage upon being irradiated with an ultraviolet ray to generate a radical, JP-A No. 2006-350237 or the like can be referred to, and such coupling agents include, for example, the following compounds;

C—C Bond Cleavage Type

1.

C—C Bond Cleavage Portion

2.

3.

4.

-continued

5.

C—O Bond Cleavage Type

7.

9.

11.

N—O Bond Cleavage Type

13.

15.

17.

6.

8.

S—N Bond Cleavage Type

10.

12.

C—Cl Bond Cleavage Type

14.

16.

The wavelength of the ultraviolet ray for irradiation in the surface graft method of B-1 in the above is preferably of from 300 nm to 400 nm, and more preferably of from 350 nm to 380 nm, although the wavelength varies with the kind of coupling agents to be used.

—Surface Graft Method of the Above 2—

The coupling agents containing a vinyl group, an acryloyl group, a methacryloyl group or an allyl group, include, specifically, vinyl trimethoxysilane, vinyl triethoxysilane, vinyl trichlorosilane, (3-acryloxypropyl) trimethoxysilane, (3-acryloxypropyl) trichlorosilane, methacryloxymethyl trimethoxysilane, methacryloxymethyl triethoxysilane, methacryloxypropyl trimethoxysilane, methacryloxypropyl triethoxysilane, methacryloxypropyl trichlorosilane, allyl trimethoxysilane, 3-(N-allylamino) propyl trimethoxysilane, allyltrichlorosilane, allyl trimethoxysilane, allyl triethoxysilane or the like, and the coupling agent represented by the following Formula (3) is suitable;

Formula (3)

In the Formula (3), X independently represents a halogen atom or an alkoxy group; $L^3$ represents a single bond or a divalent linking group; and D represents a functional group having a vinyl group, an acryloyl group, a methacryloyl group, or an allyl group.

X in the Formula (3) is preferably a chlorine atom, a methoxy group or an ethoxy group, independently.

$L^3$ in the Formula (3) is preferably a single bond or a divalent linking group such as an alkylene group having 1 to 18 carbon atoms, and an amino group.

The radical polymerization initiators include benzoyl peroxide, azodiisobutylonitrile and 2-hydroxy-2-methylpropiophenone or the like.

As the solvent for the metallocene monomer solution in the surface graft method of the above 2, it is preferable to use known aprotic polar solvents such as N,N-dimethyl formamide, dimethyl sulfoxide, dimethyl acetamide, or N-methylpyrrolidone, in consideration of the solubility of the metallocene monomer and the radical polymerization initiator, the evaporation of the solvent during the course of polymerization, or the like.

The concentration of the metallocene monomer in the metallocene monomer solution is preferably from 0.05 mol/L to 2.0 mol/L from the viewpoint of bringing the metallocene polymer to a higher molecular weight.

The compounding ratio of the radical polymerization initiator to the metallocene monomer in the metallocene monomer solution is preferably from 0.01% by mass to 10% by mass, and more preferably from 0.1% by mass to 5% by mass with respect to the metallocene monomer.

In the surface graft method of 2 in the above, a graft polymer may be formed in such a manner that the monomer is subjected to either one of ultraviolet ray irradiation or heating, or may be subjected to the both of them.

The wavelength of the ultraviolet ray for irradiation in the surface graft method of the above 2 is preferably of from 300 nm to 400 nm, and more preferably of from 350 nm to 380 nm.

When heating is performed in the surface graft method in 2 in the above, although the heating temperature varies with the kind and the half-life of the radical polymerization initiator, the heating temperature is preferably from 40° C. to 120° C., from the viewpoint of bringing the metallocene polymer to a higher molecular weight.

Further, the thickness of the metallocene polymer layer formed on the surface of the electrode is preferably from 30 Å to 1,000 Å from the viewpoint of the coloration density with the amount of deposits of metal on the counter electrode.

<The Second Electrode>

On the surface of the other transparent electrode (second electrode), on which the metallocene polymer is not provided, the metal ions in an electrolytic solution 5 are reduced by applying voltage, whereby metal is generated.

As the transparent electrode used as the second electrode, the electrodes described with regard to the first electrode can also be similarly used. Further, as the substrate, on which the second electrode is provided, the substrates described with regard to the first electrode can also be similarly used.

In the vicinity of the second electrode, while metal is deposited due to reduction of metal ions, the supporting electrolyte in the electrolytic solution is also apt to be reduced. For example, iodine is generated in the case that the supporting electrolyte is iodide ions. Iodine that is a gas diffuses in the electrolytic solution, and the stability of the redox potential may be impaired.

Accordingly, the surface of the second electrode is preferably treated with a coupling agent. The generation of iodine is suppressed by covering the second electrode with the coupling agent.

The second electrode is more preferably treated with a coupling agent having two or more amino groups. Metal ions are trapped between two amino groups, with the trapped metal ions being a nucleus, whereby the deposition and the dissolution of metal are effected. That is, an electrochemical reaction takes place at a location apart from the second electrode, and the electrochemical reaction of the electrode itself can be prevented, so that an increase in resistance and generation of cracks can be suppressed. Further, the contact area between the second electrode and the electrolytic solution decreases owing to the covalent bonds among the coupling agents, and the generation of current due to the supporting electrolyte in the electrolytic solution can be suppressed, so that the voltage drop can be reduced.

The coupling agent applied to the second electrode contains at least one kind of elements selected from the group consisting of silicon, titanium, aluminum and zirconium, similarly to the coupling agent applied to the first electrode, and contains Cl group, $OCH_3$ group or $OC_2H_5$ group as the functional groups to react with the surface of the electrode. For example, the coupling agent contains preferably a trichlorosilyl group, a triethoxysilyl group, a trimethoxysilyl group or the like.

The amino group and the above elements such as silicon may be bonded through ethylene, ethylene oxide, propylene oxide, ester, or the like.

Examples of the coupling agent having two or more amino groups include commercially available coupling agents such as N-(2-aminoethyl)-3-aminopropyl trimethoxysilane, N-(2-aminoethyl)-3-aminopropylmethy dimethoxysilane, (aminoethylaminomethyl)phenethyltrimethoxysilane, N-(6-aminohexyl)aminopropyl trimethoxysilane, 3-ureidopropyl triethoxysilane, or the like.

The number of the amino groups in the coupling agent is preferably from 2 to 4, and more preferably 2.

The treatment of the second electrode with the coupling agent having two or more amino groups is similar to the treatment method of the coupling agent explained with respect to the first electrode.

<Electrolytic Solution>

The electrolytic solution contains metal ions for depositing metal on the electrode for light modulation. As the metal ions, silver, lead, copper, bismuth or the like is exemplified, but it is preferable to use silver ions from the viewpoint of speed of response or shielding performance. In this case, it is more preferable to use a silver halide, and in particular, it is suitable to use silver iodide from the viewpoint of the solubility in the electrolytic solution.

The concentration of silver halide in the electrolytic solution is preferably in the range of from 0.5 mol/L to 3.0 mol/L, and more preferably in the range of from 0.5 mol/L to 2.0 mol/L, from the viewpoint of coloration density of silver owing to the deposition.

Further, the electrolytic solution contains a supporting electrolyte. The supporting electrolyte is not specifically restricted, as long as the supporting electrolyte dissolves in a solvent and the dissolved solution is electroconductive. When silver iodide is used as a supporting electrolyte, as iodine compounds, potassium iodide, sodium iodide, ammonium iodide, tetramethylammonium iodide, tetraethylammonium iodide, tetra-N-butylammonium iodide, or tetra-N-hexylammonium iodide is preferably used.

When an iodine compound is used as a supporting electrolyte, for dissolving silver halide, it is preferable that the concentration of an iodine compound is 0.5 to 2 times the concentration of the silver halide, and for suppressing the current due to the supporting electrolyte, it is more preferable that the concentration of the supporting electrolyte is 0.5 to 1.0 time the concentration of silver halide.

Although the speed of response varies with the velocity of deposition of silver, the deposition reaction of silver is diffusion-limited similarly to that of silver plating. Accordingly, in order to increase the display velocity, it is necessary to increase the concentration of silver ions as an electrolyte in the display composition. To this end, it is suitable to use ammonium iodide as a supporting electrolyte.

Further, unless contrary to the spirit of the present invention, as the supporting electrolyte used for the composition for the display according to the present invention, supporting electrolytes other than the above supporting electrolytes may be used. As such supporting electrolytes, the supporting electrolytes such as perchlorates, thiocyanates or sulfates, such as tetrabutylammonium perchlorate, tetraethylammonium perchlorate, thiocyanic acid isocyanate, sodium sulfide or the like can be exemplified.

Further, as additives, mercaptoimidazole, coumalin, oxalic acid, fumaric acid, maleic acid, lactic acid, ammonium thiocyanate, potassium thiocyanate, triethanolamine, or the like may be added to the electrolytic solution, as occasion demands.

Preferable examples of the additive include azoles, mercapto compounds, thioketo compounds, azaindenes, benzenethiosulfonic acid, benzenesulfinic acid, and thiourea derivatives.

Examples of the azoles include benzothiazolium salts, nitroimidazoles, nitrobenzimidazoles, chlorobenzimidazoles, bromobenzimidazoles, nitroindazoles, benzotriazoles, and aminotriazoles.

Examples of the mercapto compounds include mercaptothiazoles, mercaptobenzothiazoles, mercaptobenzimidazoles, mercaptothiadiazoles, mercaptotetrazoles (for example, 1-phenyl-5-mercaptotetrazole), mercaptopyridines, and mercaptotriazines.

Examples of the thioketo compounds include an oxazolinethione.

Examples of the azaindenes include triazaindenes, tetraazaindenes (for example, 4-hydroxy substituted (1,3,3a,7) tetraazaindenes) and pentaazaindenes.

Other specific examples include compounds disclosed in the following patents and patent publications.

| | |
|---|---|
| U.S. Pat. No. 4,400,463: | Azaindenes and Thioetherpeptizer |
| U.S. Pat. No. 4,783,398: | Dithiazoline-2-4-dione |
| U.S. Pat. No. 4,713,323: | Aminopyrazolo pyrimidine |
| U.S. Pat. No. 4,983,508: | Bispyridinium salt |
| U.S. Pat. No. 5,185,239: | Triaminopyrimidine |
| Japanese Patent Application Laid-Open (JP-A) No. 3-212639: | Aminothioether |
| JP-A No. 4-283742: | Thiourea derivatives |
| JP-A No. 11-305374: | Mercapto compounds |
| JP-A No. 11-15092: | Mercapto compounds |

Furthermore, the electrolytic solution contains an aprotic polar solvent.

As the solvents for the electrolytic solution, for example, known solvents such as N,N-dimethyl formamide, dimethyl sulfoxide, dimethyl acetamide, diethyl carbonate, a mixed solvent of propylene carbonate and ethylene carbonate, γ-butyrolactone, N-methyl pyrrolidone, N-methyl formamide, N-methylpropionamide or formamide can be used.

Here, any of the above organic solvents may be used singly, or in combination as a mixture. Moreover, unless contrary to the spirit of the present invention, it is considered that other solvents may coexist. Coexistence of two or more kinds of the organic solvents in the above is preferable in many cases, since the effect of the melting point depression can be utilized.

The electrolytic solution is held by a crosslinked polymer, and may be solidified, thickened or gelated, so that a polymer may be contained in the electrolytic solution. When the electrolytic solution is solidified, thickened or gelated, handling of the electrolytic solution becomes easy, and the possibility of leakage of the electrolytic solution from the device becomes low. The content ratio of the polymer in the electrolytic solution is not particularly restricted, and can be arbitrarily determined, as occasion demands.

Here, the solidification means a state where the electrolytic solution is not flowable and, the state may be a so-called solid, or may be deformable, for example, as clay.

When the electrolytic solution is solidified, thickened or gelated, the electrolytic solution is suitably solidified, thickened or gelated in the state where the metal ion, the polymer and the solvent for the treatment of the surface of the electrode are contained in the electrolytic solution.

Polymers for solidification, thickening or gelated are not specifically restricted, but known materials such as polyvinyl pyrrolidone, polyvinylidene fluoride, polyacrylonitrile, polyethylene oxide or polymethylmethacrylate can be used.

Moreover, polymers formed by polymerizing a vinyl polymerizable compound such as a vinyl monomer or a vinyl oligomer may be used.

These polymers are preferably crosslinked products. Crosslinked products become gel, and even if a small amount of the product is used, the display composition can be maintained at a solid state or a highly viscous state, so that the possibility of leakage of the light modulation composition to outside becomes low.

The vinyl polymerizable compounds usable for solidification, increase in viscosity or gelation may be used, as long as the compounds have a vinyl group. For example, such compounds include known compounds such as:

(1) mono functional monomers such as vinyl alcohol, methoxy diethyleneglycol methacrylate, methoxy triethyleneglycol acrylate or phenoxyethyl acrylate;

(2) bifunctional monomers such as (poly)ethyleneglycol (meth)acrylate, or (poly)propyleneglycol di(meth)acrylate;

(3) trifunctional monomers such as trimethylolpropane tri(meth)acrylate or tetramethylolmethane tri(meth)acrylate;

(4) tetrafunctional monomers such as tetramethylolmethane tetraacrylate or pentaerythritol tetraacrylate; or (5) hexafunctional monomers such as dipentaerythritol hexaacrylate.

In the vinyl polymerizable compounds, two more functional vinyl polymerizable compounds having two or more vinyl groups in a molecule are suitable, since a crosslinked polymer can be easily obtained.

Moreover, the length of the alkyl chain, the ethylene oxide chain or the propyleneoxide chain in a monomer is arbitrary.

The amount of these monomers is preferably from 5% by mass to 20% by mass, and more preferably from 5% by mass to 12% by mass with respect to the total amount of the electrolytic solution.

As a polymerization initiator contained in the electrolytic solution, known materials such as an azo-based polymerization initiator or a peroxide, is exemplified.

The content of the polymerization initiator contained in the electrolytic solution is preferably from 0.5 parts by mass to 30 parts by mass, and more preferably from 0.1 parts by mass to 5 parts by mass, relative to 100 parts by mass of monomer.

The polymerization of the monomer in the electrolytic solution with the polymerization initiator can be performed by applying heat, light or the like to the monomer.

Further, a spacer for maintaining the clearance between the first electrode and the second electrode at a certain distance may be provided in the electrolytic solution.

Although a particulate or pillar spacer may be used according to the present invention, particulate spacer is more preferable in view of a higher aperture ratio and a lower contact area between the spacer and the transparent electrode. Materials usable for the spacer are any materials insoluble in other components in the display composition. For example, various kinds of glass; ceramics such as, silica, alumina, zirconia, or aluminum nitride; resins such as polyethylene, polypropylene, or styrene-divinylbenzene; and metals such as iron and stainless steel, can be suitably used.

The size of the particulate spacer (the clearance between the first electrode and the second electrode) can be appropriately selected according to the purposes, but in general, the size is preferably in the range of from 20 µm to 500 µm by an average particle diameter. Particles with a smaller variation in particle size are preferable. Furthermore, the shape of the particulate spacer may not be necessarily complete spherical, but other fine particles may adhere to the surface of the particles. The surface of particles may be rough.

<Other Structural Component>

An inorganic material layer such as silicon oxide or aluminum oxide, or an organic material film such as polyamide may be provided between the electrolytic solution and a transparent electrode, so that effects such as an increase in adhesiveness of the electrolytic solution with the electrode, and an increase in barrier function of the electrode against gas or solvent can be exerted.

The electrodeposition method light modulation according to the present invention is configured such that the electrodes face each other. When the transparent electrodes are adhered to each other with an adhesive via a spacer, the adhesives such as a photocurable adhesive, a thermosetting adhesive, a hot melt adhesive and an epoxy-based two liquid mixing type adhesive can be used. It is necessary that the adhesive has a low solubility in a solvent contained in the electrolytic solution, and it is preferable to use a hot melt adhesive formed from an olefin-based resin.

The electrodeposition method light modulating device according to the present invention provides uniform coloration density within the substrate face, and a high transparency at the time of being transparent, so that the light modulating device is applicable to a large-sized substrate. The light modulating device is characterized by a high speed of response.

2. An Electrodeposition Method Reflective Display Device

A electrodeposition method reflective display device according to the present invention has similar configuration to the electrodeposition method light modulating device in the above except that the electrolytic solution contains a white pigment. Therefore, the explanation will be omitted with regard to the same components. The electrodeposition method reflective display device is preferably a state where the electrolytic solution is held by a gelatinous polymer and the white pigment is dispersed in the gelatinous polymer, from the viewpoint of high whiteness at the time of being white.

Examples of the white pigment include a inorganic pigment such as a silica dioxide, a titanium dioxide, a barium sulfate, a barium titanate, a lithopone, an aluminum oxide, a calcium carbonate, a silicon oxide, an antimony trioxide, a titanium phosphate, a zinc oxide, a white lead, or a zirconium oxide; or an organic powder such as a polystyrene, styrene-divinylbenzene copolymer.

Among these pigments, it is preferable to use a titanium dioxide, an aluminum oxide or a barium titanate, and a titanium dioxide is particularly effective. The titanium dioxide may be a rutile type or an anatase type. An anatase type is preferable when prioritizing whiteness, and a rutile type is preferable when prioritizing the covering. In view of both whiteness and sharpness, a rutile type and an anatase type may be blended. These titanium dioxides may be produced by a sulfate method or a chloride method.

Specific examples of titanium dioxide include JR, JRNC, JR-301, 403, 405, 600A, 605, 600E, 603, 701, 800, 805, 806, JA-1, C,3,4,5, MT-01, 02, 03, 04, 05, 100AQ, 100SA, 100SAK, 100SAS, 100TV, 100Z, 100ZR, 150W, 500B, 500H, 500SA, 500SAK, 500SAS, 500T, SMT-100SAM, 100SAS, 500SAM, 500SAS (all of which are manufactured by TAYCA CORPORATION), CR-50, 50-2, 57, 58, 58-2, 60, 60-2, 63, 67, 80, 85, 90, 90-2, 93, 95, 97, 953, Super70, PC-3, PF-690, 691, 711, 736, 737, 739, 740, 742, R-550, 580, 630, 670, 680, 780, 780-2, 820, 830, 850, 855, 930, 980, S-305, UT771, TTO-51(A), 51(C), 55(A), 55(B), 55(C), 55(D), S-1, S-2, S-3, S-4, V-3, V-4, MPT-136, FTL-100, 110, 200, 300 (all of which are manufactured by ISHIHARA SANGYO KAISHA LTD.), KA-10, 15, 20, 30, KR-310, 380, KV-200, STT-30EHJ, 65C-S, 455, 485SA15, 495M, 495MC (all of which are manufactured by Titan Kogyo), TA-100, 200, 300, 400, 500, TR-600, 700, 750, 840, 900 (all of which are manufactured by Fuji Titium Industry Co., Ltd.), and these titanium dioxide may be used alone or in combination.

In order to improving dispersibility with regard to the polymer gel, a titanium dioxide may be treated by known material such as a silane coupling agent having an amino group, a glycidyl group, an ureide group, an isocyanate group, a mercapto group, a vinyl group, an allyl group, an acryloxy group, a methacryloxy, a styryl group as a functional group.

Alternatively, as a dispersant, known soluble polymers such as a polyvinylpyrolidone, a polyethylene oxide, or a cyanoethylated cellulose may be added thereto. The amount of the soluble polymers in the electrolytic layer is preferably from 0.5% by mass to 10% by mass, more preferably from 0.5% by mass to 7% by mass, and even more preferably from 1% by mass to 5% by mass.

The kind or additive amount of the white pigment may be decided for achievement of sufficient whiteness.

The content of the white pigment in the electrolytic solution is generally from 10% to 70% by mass, preferably from 15% to 60% by mass, and more preferably from 20% to 60% by mass.

Industry Co., Ltd.) in N,N-dimethyl acetamide in an amount of 30% by mass, and an ITO substrate treated with the following compound 1 was immersed in the ferrocene monomer solution, and thereafter, the substrate was exposed by an exposing machine (UVX 02516LP01(trade name); 1.5 kw, (manufactured by Ushio Inc.)) for five minutes, putting a cover glass on the substrate.

The substrate was washed again with acetone and an ITO electrode, to which the ferrrocene polymer was fixed, was produced. The ITO electrode was measured by ELIPSPME-TER DHA-XA/S4 ((trade name) manufactured by Mizojiri Optical Co., Ltd.), and it was found that a ferrocene layer was formed at a thickness of 65 Å.

(Compound 1)

Examples of dispersing methods of the white pigment include a vibration mill, a roll mill, a ball mill, a beads mill, a paint shaker or a homogenizer, preferably a roll mill, a ball mill or a beads mill from the viewpoint of the high dispersibility of the white pigments.

The electrodeposition method reflective display device according to the present invention is preferably configured such that a reflective layer is disposed on a back face of either one of the electrode substrates. The reflective layer may be disposed by aluminum evaporation, adhesion of an evaporated aluminum film or the like on a back face of the electrode substrate.

The electrodeposition method reflective display device according to the present invention provides uniform coloration density within the substrate face, so that the reflective display device is applicable to a large-sized substrate. The reflective display device is characterized by a high whiteness at the time of being white and a high speed of response.

EXAMPLES

Hereinafter, the present invention will be described in more detail with reference to the following examples, but the examples are only for the purpose of explaining the present invention, and the present invention is not to the examples.

Example 1

Production of First Transparent Electrode

The ITO surface of an ITO electrode substrate ($10\Omega/\square$) with a size of 100 mm×100 mm was subjected to an ozone treatment by use of a UV ozone cleaner (UV24 (trade name) manufactured by Japan Laser Electronic Company) for five minutes. The ITO electrode substrate was immersed for 12 hours in a solution formed by dissolving 1.0% by mass of the following compound (compound 1) in a dehydrated toluene. The ITO electrode substrate was dried at room temperature, and washed with toluene and acetone, and dried again.

Next, the ferrocene monomer solution was produced by dissolving vinyl ferrocene (manufactured by Tokyo Chemical <Production of Second Transparent Electrode>

The ITO surface of an ITO electrode substrate ($10\Omega/\square$) with a size of 100 mm×100 mm was subjected to an ozone treatment by use of a UV ozone cleaner (UV24 (trade name) manufactured by Japan Laser Electronic Company) for five minutes. Five parts by mass of N-(2-amino ethyl)-3-aminopropyl trimethoxysilane was dissolved in 5 parts by mass of pure water and 90 parts of isopropyl alcohol, and the mixture was stirred at room temperature for one hour. The resultant mixture was dropped onto the ITO electrode substrate, and dried on a hot plate at a temperature of 80° C. for 5 minutes. After the ITO electrode substrate was washed with isopropyl alcohol and pure water by means of ultrasonic wave, the substrate was dried, and a coupling-treated substrate was produced.

<Production of Light Modulating Device for Test>

The first transparent electrode and the second transparent electrode were laminated together with a gap of 75 μm. An electrolytic solution formed by dissolving silver iodide (1.0 mol/L) and ammonium iodide (0.5 mol/L) in N-methyl formamide was introduced into the gap between the electrodes, and the introducing inlet was closed with ARALDITE STANDARD ((trade name) available from Nichiban Co., Ltd.) to produce a light modulating device 1 for test.

<Evaluation>

When a voltage of −5.0V was applied to the light modulating device 1 for testing (GND: the second transparent electrode), the entire light modulating device was light-shielded, and both the transmittance at the central portion of the substrate and the transmittance in the vicinity of the take-out electrode were 1% or less at a wavelength of 550 nm.

On the other hand, when the circuit was opened, silver was dissolved rapidly and the light modulating device became transparent within 60 seconds. At this time, the transmittance at a wavelength of 550 nm was 82%, and the transmittance at a wavelength of 450 nm was 82%.

Example 2

Change of Kind of Coupling Agent in the Second Transparent Electrode

A light modulating device 2 for testing was produced in a manner similar to Example 1 except that N-(6-aminohexyl) aminopropyl trimethoxysilane was used as a silane coupling agent for the second transparent electrode.

When a voltage of −5.0V was applied to the light modulating device 2 for testing (GND: the second transparent electrode), the entire light modulating device was light-shielded, and both the transmittance at the central portion of the substrate and the transmittance in the vicinity of the take-out electrode were 1% or less at a wavelength of 550 nm. On the other hand, when the circuit was opened, silver was dissolved rapidly and the light modulating device became transparent within 60 seconds. At this time, the transmittance at a wavelength of 550 nm was 82%, and the transmittance at a wavelength of 450 nm was 82%.

Example 3

Polymer Solid Electrolyte

The first transparent electrode and second transparent electrode similar to Example 1 were laminated together with a gap of 75 µm.

In 88 parts by mass of the electrolytic solution of Example 1, were dissolved 10 parts by mass of 2-hydroxy-1-acryloxy-3-methacryloxy propane (701A (trade name) manufactured by Shin-Nakamura Chemical Co., Ltd.) and 2 parts by mass of polyethyleneglycol dimethacrylate (Polyethylene Glycol (1000) Dimethacrylate (trade name) manufactured by Polysciences Inc.) as bifunctional monomers. To the mixture, was added 0.6 part by mass of 2-hydroxy-2-methylpropiophenon (DAROCUR1173 (trade name); manufactured by Ciba Specialty Chemicals) as a polymerization initiator, and a precursor solution of a polymer solid electrolyte was produced.

The precursor solution was introduced into the gap between the electrodes, the precursor solution was cured by being irradiated with an ultraviolet ray, whereby a polymer solid electrolyte was obtained. The introducing inlet was closed with ARALDITE STANDARD ((trade name) available from Nichiban Co., Ltd.), and a light modulating device 3 for testing was produced.

When a voltage of −5.0V was applied to the light modulating device 3 for testing (GND: the second transparent electrode), the entire light modulating device was light-shielded, and both the transmittance at the central portion of the substrate and the transmittance in the vicinity of the take-out electrode were 1% or less at a wavelength of 550 nm.

On the other hand, when the circuit was opened, silver was dissolved rapidly and the light modulating device became transparent within 3 minutes. At this time, the transmittance at a wavelength of 550 nm was 78%, and the transmittance at a wavelength of 450 nm was 78%.

Example 4

Change in Bonding Method of Ferrocene Polymer

<Production of First Transparent Electrode>

To 300 parts by mass of methylethyl ketone, was dissolved 30 parts by mass of vinyl ferrocene. The mixture was bubbled with nitrogen gas in a three-neck flask for one hour, and heated to 60° C. in an oil bath with stirring under nitrogen atmosphere. A polymerization initiator having a carboxyl group VA-057 ((trade name) manufactured by Wako Pure Chemical Industries Ltd.) (0.6 part by mass) was dissolved in 10 parts of methylethyl ketone, and the mixture was added dropwise to the mixture in the three-neck flask over one hour, and thereafter, the resultant mixture was heated at 60° C. for 7 hours. The methyl ethylketone was recovered with an evaporator, and a ferrrocene with a carboxyl group at the terminal end thereof was obtained.

The ITO surface of an ITO electrode substrate ($10\Omega/\square$) with a size of 100 mm×100 mm was subjected to an ozone treatment by use of a UV ozone cleaner ((UV24 (trade name) manufactured by Japan Laser Electronic Company) for five minutes. Five parts by mass of 3-aminopropyl trimethoxysilane was dissolved in 5 parts by mass of pure water and 90 parts of isopropyl alcohol, and the mixture was stirred at room temperature for one hour. The resultant mixture was dropped onto the ITO electrode substrate, and dried on a hot plate at a temperature of 80° C. for 5 minutes. After the ITO substrate was washed with isopropyl alcohol and pure water by means of ultrasonic wave, the substrate was dried, and a coupling-treated substrate was produced.

A ferrocene polymer was dissolved in N,N-dimethylacetamide, and the solution was spin-coated on the ITO electrode substrate treated with 3-aminopropyl trimethoxysilane, and the coated substrate was heated at a temperature of 200° C. for one hour. The resultant substrate was washed with N,N-dimethylacetamide and acetone, and a substrate, to which the ferrocene polymer was fixed, was produced.

The thickness of the ferrocene polymer layer was measured in a manner similar to that of Example 1, and the layer thickness of 800 Å was obtained.

<Production of Second Transparent Electrode>

A second transparent electrode was produced in a manner similar to Example 1.

<Production of Light Modulating Device for Test and Evaluation Thereof>

A light modulating device 4 for testing was produced in a manner similar to Example 1 except that the first transparent electrode 1 produced in Example 4 was used. The light modulating device 4 for testing was also evaluated in a manner similar to that of Example 1.

When a voltage of −5.0V was applied to the light modulating device 4 for testing (GND: the second transparent electrode), the entire light modulating device was light-shielded, and both the transmittance at the central portion of the substrate and the transmittance in the vicinity of the take-out electrode were 1% or less at a wavelength of 550 nm. On the other hand, when the circuit was opened, silver was dissolved rapidly and the light modulating device became transparent within 3 minutes. At this time, the transmittance at a wavelength of 550 nm was 75%, and the transmittance at a wavelength of 450 nm was 75%.

Example 5

Change of Kind of Ferrocene Polymer

A light modulating device 5 for testing was produced in a manner similar to Example 1 except that vinyl ferrocene in Example 1 was replaced with methacryloferrocene. The thickness of the ferrocene polymer layer was measured in a manner similar to that of Example 1, and the layer thickness of 180 Å was obtained.

When a voltage of −5.0V was applied to the light modulating device 5 for testing (GND: the second transparent electrode), the entire light modulating device was light-shielded, and both the transmittance at the central portion of the substrate and the transmittance in the vicinity of the take-out electrode were 1% or less at a wavelength of 550 nm. On the other hand, when the circuit was opened, silver was dissolved rapidly and the light modulating device became transparent within 60 seconds. At this time, the transmittance at a wavelength of 550 nm was 75%, and the transmittance at a wavelength of 450 nm was 75%.

Example 6

White Polymer Solid Electrolyte

The first transparent electrode and second transparent electrode similar to Example 1 were laminated together with a gap of 75 μm.

In 86 parts by mass of the electrolytic solution of Example 1, were dissolved 2 parts by mass of cyanoethylated cellulose (CR-S (trade name; manufactured by Shin-Etsu Chemical Co., Ltd.), 10 parts by mass of 2-hydroxy-1-acryloxy-3-methacryloxy propane (701A (trade name; manufactured by Shin-Nakamura Chemical Co., Ltd.) and 2 parts by mass of polyethyleneglycol dimethacrylate (Polyethylene Glycol (1000) Dimethacrylate (trade name) manufactured by Polysciences Inc.) as bifunctional monomers. To the mixture, was added 0.6 part by mass of 2-hydroxy-2-methylpropiophenon (DAROCUR1173 (trade name); manufactured by Ciba Specialty Chemicals) as a polymerization initiator, and a precursor solution of a polymer solid electrolyte was produced.

To the precursor solution, was mixed 20 part by mass of titanium dioxide (TITANIX JR-301 (trade name) manufactured by TAYCA CORPORATION), and the mixture was agitated at rotating speed 1000 rpm for five minutes with agitator ARE-250 ((trade name) manufactured by THINKY CORPORATION), and then carried out defoaming treatment.

The precursor solution of a polymer solid electrolyte was introduced into the gap between the electrodes, the precursor solution was cured by being irradiated with an ultraviolet ray, whereby a polymer solid electrolyte was obtained. The introducing inlet was closed with ARALDITE STANDARD ((trade name) available from Nichiban Co., Ltd.). An evaporated aluminum film was laminated on a back face of the second transparent electrode, and a light modulating device for testing was produced.

When a voltage of −5.0V was applied to the light modulating device for testing (GND: the second transparent electrode), the entire light modulating device exhibited black, and both the reflectance (Y value) at the central portion of the substrate and the reflectance (Y value) in the vicinity of the take-out electrode were 2%.

On the other hand, when the circuit was opened, silver was dissolved rapidly and the light modulating device exhibited white within 3 minutes. At this time, the reflectance (Y value) was 82%.

Comparative Example 1

The second transparent electrode in Example 1 and an untreated ITO electrode were laminated together with a gap of 75 μm. An electrolytic solution formed by dissolving silver iodide (1.0 mol/L), ammonium iodide (0.5 mol/L) and ferrocene (0.1 mol/L) in N-methyl formamide was introduced into the gap between the electrodes, and the introducing inlet was closed with ARALDITE STANDARD ((trade name) available from Nichiban Co., Ltd.), whereby a light modulating device 1 for comparative test was produced.

When a voltage of −5.0V was applied to the light modulating device 1 for comparative test (GND: a coupling-treated substrate), the entire light modulating device was light-shielded, and both the transmittance at the central portion of the substrate of the substrate and the transmittance in the vicinity of the take-out electrode were 1% or less at a wavelength of 550 nm.

On the other hand, when the circuit was opened, residues resulting from un-disappeared silver remained, and ferrocenium ion particles floated on the counter electrode, so that it took 10 minutes or more to become transparent for the device. At this time, the transmittance at a wavelength of 550 nm was 80%, and the transmittance at a wavelength of 450 nm was 70% due to the absorption by ferrocene.

Comparative Example 2

Comparative Example 2 is equivalent to a light modulating device, to which the electrochromic element in Example 1 disclosed in JP-A No. 10-206907 is applied.

A coupling-treated transparent electrode substrate with 3-aminopropyl trimethoxysilane was produced. A substrate was immersed in a ferrocene monomer solution prepared by dissolving ferrocene carboxylic acid (manufactured by Tokyo Chemical Industry Co., Ltd.) in an amount of 30% by mass in N,N-dimethyl acetamide (dehydrated), and the substrate was heated at 100° C. for 3 hours, so that an electrode substrate, to which a ferrocene monomer was fixed, was obtained. A light modulating device 2 for comparative test was produced in a manner similar to Example 1 except that the thus obtained electrode substrate was used.

When the voltage of −5.0V (GND: coupling treated substrate) was applied to the light modulating device 2 for comparative test, silver was hardly deposited in the central portion of the substrate.

Comparative Example 3

Comparative Example 3 is equivalent to a light modulating device, to which the electrochromic element disclosed in JP-A No. 63-24225 is applied.

To 300 parts by mass of methyl ethylketone, was dissolved 30 parts by mass of vinyl ferrocene. The mixture was bubbled with nitrogen gas in a three-neck flask for one hour, and heated to 60° C. in an oil bath with stirring under nitrogen atmosphere. A polymerization initiator (V-65 (trade name) manufactured by Wako Pure Chemical Industries Ltd.) (0.6 part by mass) was dissolved in 10 parts of methyl ethylketone, and the mixture was added dropwise to the mixture in the three-neck flask over one hour, and thereafter, resultant mixture was heated at 60° C. for 7 hours. The methyl ethylketone was recovered with an evaporator, and a ferrrocene polymer was produced.

The ferrocene polymer (5 parts by mass) was dissolved in 95 parts by mass of N,N-dimethylacetamide, and the solution was coated on an ITO electrode by use of a bar coater, and the coated electrode was dried at a temperature of 200° C., whereby a transparent electrode with a ferrocene polymer layer having a thickness of 0.5 μm was produced.

When the voltage of −5.0V (GND: coupling treated substrate) was applied to the light modulating device 3 for comparative test, silver was hardly deposited in the central part of the substrate.

The foregoing description of the embodiments of the present invention has been provided for the purposes of illustration and description. It is not intended to be exhaustive or to limit the present invention to the precise forms disclosed.

Obviously, many modifications and variations will be apparent to practitioners skilled in the art. The embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents. All publications, patent applications, and technical standards mentioned in this specification are herein incorporated by reference to the same extent as if each individual publication, patent application, or technical standard was specifically and individually indicated to be incorporated by reference.

What is claimed is:

1. An electrodeposition method light modulating device comprising:
   (1) a transparent electrode, to which a polymer having a metallocene at a side chain thereof is fixed by a chemical bond;
   (2) a transparent electrode that is disposed to face the transparent electrode (1), and forms metal through a reducing reaction of metal ions thereon; and
   (3) an electrolytic solution containing the metal ions, which can be reduced by applying current thereto, and disposed between the transparent electrode (1) and the transparent electrode (2).

2. The electrodeposition method light modulating device according to claim 1, wherein the polymer having a metallocene at a side chain thereof is fixed through a coupling agent containing at least one element selected from the group consisting of silicon, titanium, aluminum and zirconium on the transparent electrode (1).

3. The electrodeposition method light modulating device according to claim 2, wherein the coupling agent on the transparent electrode (1) is represented by the following Formula (1):

Formula (1)

wherein X independently represents a halogen atom or an alkoxy group; $L^1$ represents a single bond or a divalent linking group; and A represents an amino group, a ureido group, a sulfide group, a mercapto group, a glycidyl group or an isocyanate group.

4. The electrodeposition method light modulating device according to claim 2, wherein the coupling agent on the transparent electrode (1) is represented by the following Formula (2):

Formula (2)

wherein X independently represents a halogen atom or an alkoxy group; $L^2$ and $L^{2'}$ each independently represent a single bond or a divalent linking group; B represents an azo group (—N.dbd.N—); and R and R' each independently represent an arbitrary functional group.

5. The electrodeposition method light modulating device according to claim 2, wherein the coupling agent on the transparent electrode (1) is a coupling agent having a bond which generates a radical through cleavage upon being irradiated with an ultraviolet ray.

6. The electrodeposition method light modulating device according to claim 2, wherein the coupling agent on the transparent electrode (1) is represented by the following Formula (3):

Formula (3)

wherein X independently represents a halogen atom or an alkoxy group; $L^3$ represents a single bond or a divalent linking group; and D represents a functional group having a vinyl group, an acryloyl group, a methacryloyl group or an allyl group.

7. The electrodeposition method light modulating device according to claim 1, wherein the transparent electrode (2) is formed by being treated with a silane coupling agent having two or more amino groups.

8. The electrodeposition method light modulating device according to claim 1, wherein the polymer having a metallocene at a side chain thereof is represented by the following Formula (1):

Formula (I)

wherein R represents a hydrogen atom or a methyl group; Y represents a single bond or a divalent linking group; M represents Fe, Ti, Zr or Ni; and n represents an integer of from 2 to 100,000.

9. The electrodeposition method light modulating device according to claim 8, wherein Y in the Formula (I) represents a single bond or the following Structural Formula Y:

Structural Formula Y wherein $R^2$ represents a hydrogen atom or an alkyl group.

10. The electrodeposition method light modulating device according to claim 8, wherein M in the Formula (I) is Fe.

11. The electrodeposition method light modulating device according to claim 1, wherein the polymer having a metallocene at a side chain thereof is a polymer of a ferrrocene derivative.

12. The electrodeposition method light modulating device according to claim 1, wherein the metal ions in the electrolytic solution include silver ions.

13. The electrodeposition method light modulating device according to claim 1, wherein the electrolytic solution contains silver halide.

14. The electrodeposition method light modulating device according to claim 13, wherein the electrolytic solution further contains a supporting electrolyte, and the concentration (mol/L) of the supporting electrolyte is from 0.5 to two times the concentration of the silver halide.

15. An electrodeposition method reflective display device comprising:
  (1) a transparent electrode, to which a polymer having a metallocene at a side chain thereof is fixed by a chemical bond;
  (2) a transparent electrode that is disposed to face the transparent electrode (1), and forms metal through a reducing reaction of metal ions thereon; and
  (3) an electrolytic solution that is held by a gelatinous polymer and contains a white pigment and the metal ions, which can be reduced by applying current thereto, and disposed between the transparent electrode (1) and the transparent electrode (2).

16. The electrodeposition method reflective display device according to claim 15, wherein the polymer having a metallocene at a side chain thereof is fixed through a coupling agent containing at least one element selected from the group consisting of silicon, titanium, aluminum and zirconium on the transparent electrode (1).

17. The electrodeposition method reflective display device according to claim 15, wherein the transparent electrode (2) is formed by being treated with a silane coupling agent having two or more amino groups.

18. The electrodeposition method reflective display device according to claim 15, wherein the polymer having a metallocene at a side chain thereof is a polymer of a ferrrocene derivative.

* * * * *